(12) United States Patent
Suciu et al.

(10) Patent No.: US 10,378,374 B2
(45) Date of Patent: Aug. 13, 2019

(54) ACTIVE CLEARANCE CONTROL FOR GAS TURBINE ENGINE

(71) Applicant: United Technologies Corporation, Hartford, CT (US)

(72) Inventors: Gabriel L. Suciu, Glastonbury, CT (US); Jesse M. Chandler, South Windsor, CT (US); Nathan Snape, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1194 days.

(21) Appl. No.: 14/672,561

(22) Filed: Mar. 30, 2015

(65) Prior Publication Data
US 2015/0337675 A1    Nov. 26, 2015

Related U.S. Application Data

(60) Provisional application No. 61/975,161, filed on Apr. 4, 2014.

(51) Int. Cl.
| | | |
|---|---|---|
| *F01D 11/14* | (2006.01) | |
| *F01D 25/24* | (2006.01) | |
| *F01D 25/14* | (2006.01) | |
| *F01D 17/00* | (2006.01) | |
| *F02C 5/12* | (2006.01) | |
| *F01D 11/24* | (2006.01) | |
| *F02C 7/25* | (2006.01) | |

(52) U.S. Cl.
CPC .............. *F01D 11/14* (2013.01); *F01D 11/24* (2013.01); *F01D 17/00* (2013.01); *F01D 25/145* (2013.01); *F01D 25/24* (2013.01); *F02C 5/12* (2013.01); *F02C 7/25* (2013.01); *F05D 2220/32* (2013.01); *F05D 2260/231* (2013.01)

(58) Field of Classification Search
USPC .................. 60/799, 39.11, 763, 765, 749
See application file for complete search history.

(56) References Cited

U.S. PATENT DOCUMENTS

| 2,548,886 | A | * | 4/1951 | Howard ................... F01D 5/066 |
|---|---|---|---|---|
| | | | | 29/889.2 |
| 4,576,547 | A | | 3/1986 | Weiner et al. |
| 4,648,241 | A | | 3/1987 | Putman et al. |
| 4,928,240 | A | | 5/1990 | Davison et al. |
| 5,012,420 | A | | 4/1991 | Walker et al. |

(Continued)

FOREIGN PATENT DOCUMENTS

| GB | 2057574 | 4/1981 |
|---|---|---|
| GB | 2248089 | 3/1992 |

OTHER PUBLICATIONS

EP Extended Search Report for EP Application 15161187.8 dated Jul. 30, 2015.

*Primary Examiner* — Binh Q Tran
(74) *Attorney, Agent, or Firm* — Carlson, Gaskey & Olds, P.C.

(57) ABSTRACT

A gas turbine engine includes a fluid intake. A turbine section includes a turbine case. A firewall is located upstream of the turbine section. A conduit is configured to direct a fluid from the fluid intake to the turbine case. A valve is located on a first side of the firewall opposite from the turbine section and is configured to regulate a flow of the fluid through the conduit.

20 Claims, 3 Drawing Sheets

(56) References Cited

U.S. PATENT DOCUMENTS

| | | | | |
|---|---|---|---|---|
| 5,265,408 A | * | 11/1993 | Sheoran | B64D 33/08 60/262 |
| 5,943,856 A | * | 8/1999 | Lillibridge | B64D 33/06 181/220 |
| 7,125,223 B2 | | 10/2006 | Turnquist et al. | |
| 8,820,045 B2 | * | 9/2014 | Dede | F02C 7/25 60/39.094 |
| 9,714,622 B2 | * | 7/2017 | Nakade | F02D 41/10 |
| 2004/0083737 A1 | * | 5/2004 | Wright | F23R 3/005 60/773 |
| 2008/0159846 A1 | | 7/2008 | Smith | |
| 2011/0265481 A1 | * | 11/2011 | Koranek | F23D 17/002 60/722 |
| 2013/0028705 A1 | | 1/2013 | Lagueux | |
| 2013/0104564 A1 | | 5/2013 | Arar | |
| 2013/0149123 A1 | | 6/2013 | Laurello | |
| 2013/0330167 A1 | | 12/2013 | Rioux | |
| 2014/0010639 A1 | * | 1/2014 | Snape | F01D 25/18 415/177 |
| 2014/0030066 A1 | | 1/2014 | Schimmels et al. | |

\* cited by examiner

ACTIVE CLEARANCE CONTROL FOR GAS TURBINE ENGINE

CROSS-REFERENCE TO RELATED APPLICATIONS

This application claims priority to U.S. Provisional Application No. 61/975,161, which was filed on Apr. 4, 2014 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Operation of the gas turbine engine results in the combustor section generating large amounts of heat. The heat generated by the combustor section elevates the operating temperatures of the turbine section. When the turbine section temperature elevates, it causes a turbine case that surrounds turbine blades to expand. The expansion of the turbine case can form a larger gap between the turbine blades and the turbine case. This larger gap allows air to travel between the turbine blades and the turbine case, which decreases the efficiency of the gas turbine engine. Therefore, there is a need to reduce the gap between the turbine blades and the turbine case.

SUMMARY

In one exemplary embodiment, a gas turbine engine includes a fluid intake. A turbine section includes a turbine case. A firewall is located upstream of the turbine section. A conduit is configured to direct a fluid from the fluid intake to the turbine case. A valve is located on a first side of the firewall opposite from the turbine section and is configured to regulate a flow of the fluid through the conduit.

In a further embodiment of the above, a combustor section is located on a second side of the firewall opposite the first side.

In a further embodiment of any of the above, at least one fluid delivery manifold is in fluid communication with the conduit for directing the fluid along the turbine case.

In a further embodiment of any of the above, the fluid delivery manifold surrounds the turbine case.

In a further embodiment of any of the above, the conduit is configured to direct the fluid from the first side of the firewall to a second side of the firewall opposite the first side.

In a further embodiment of any of the above, the fluid intake extends through in an inner nacelle.

In a further embodiment of any of the above, the fluid intake is generally elliptical.

In a further embodiment of any of the above, the fluid intake extends into a fan bypass flow path.

In a further embodiment of any of the above, the firewall includes an ECS manifold and a nacelle ventilation manifold.

In a further embodiment of any of the above, the fluid intake is located on a first side of the firewall.

In another exemplary embodiment, an active clearance control assembly includes a firewall, a fluid intake and an active clearance control manifold. A conduit is configured to direct a fluid from the fluid intake on a first axial side of the firewall through the firewall to the active clearance control manifold on a second axial side of the firewall. A valve is located on the first axial side of the firewall and is configured to regulate the flow of the fluid through the conduit.

In a further embodiment of the above, the firewall is configured to be located upstream of a combustor section.

In a further embodiment of any of the above, the active clearance control manifold is configured to surround a turbine case.

In a further embodiment of any of the above, the fluid intake is configured to be flush along an inner nacelle.

In a further embodiment of any of the above, the fluid intake includes a generally elliptical opening.

In a further embodiment of any of the above, the fluid intake is configured to extend into an inner nacelle flow path.

In a further embodiment of any of the above, the firewall includes a receptacle for accepting a d-door.

The various features and advantages of this disclosure will become apparent to those skilled in the art from the following detailed description. The drawings that accompany the detailed description can be briefly described as follows.

DETAILED DESCRIPTION

Figure 1:
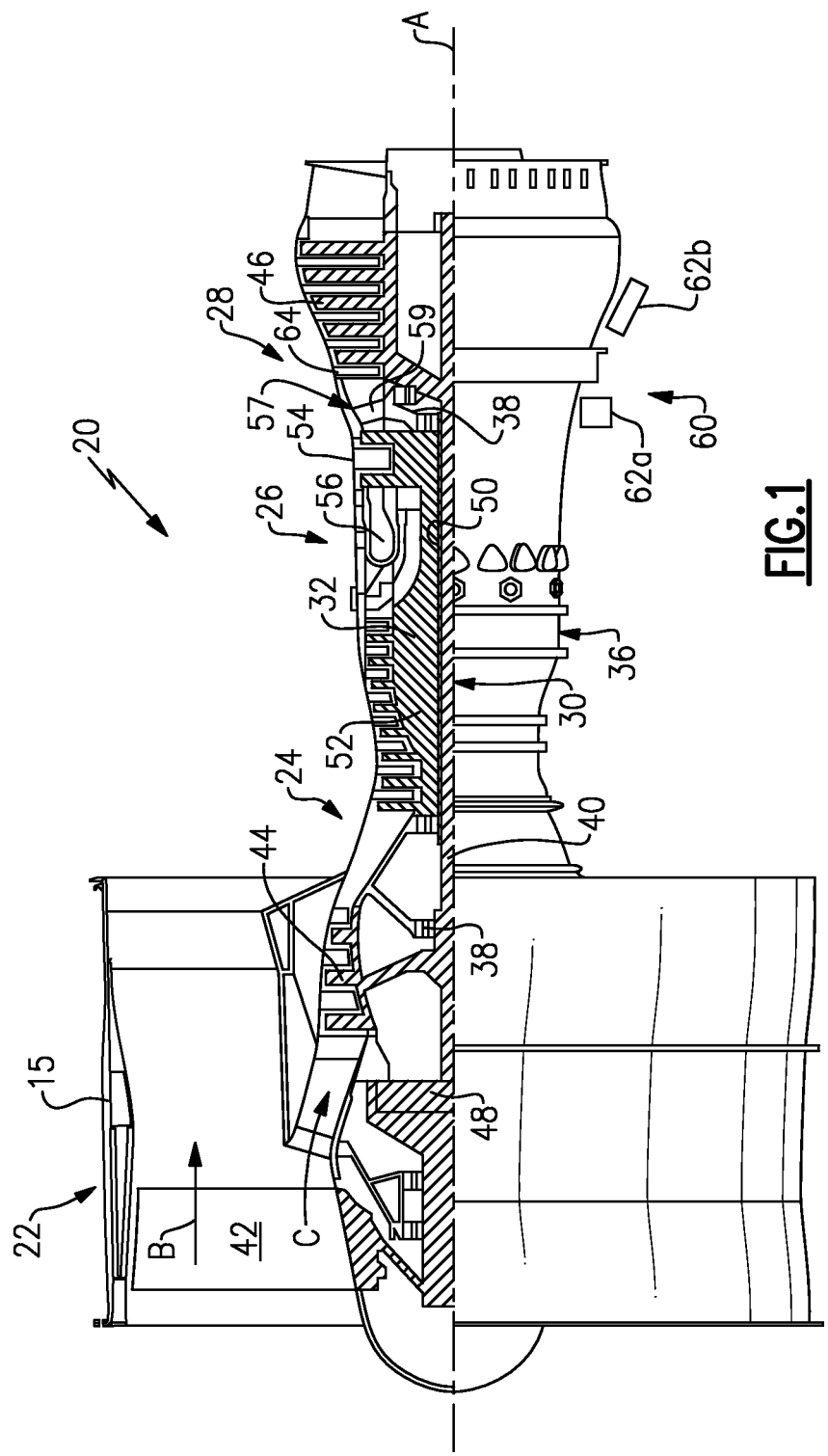
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
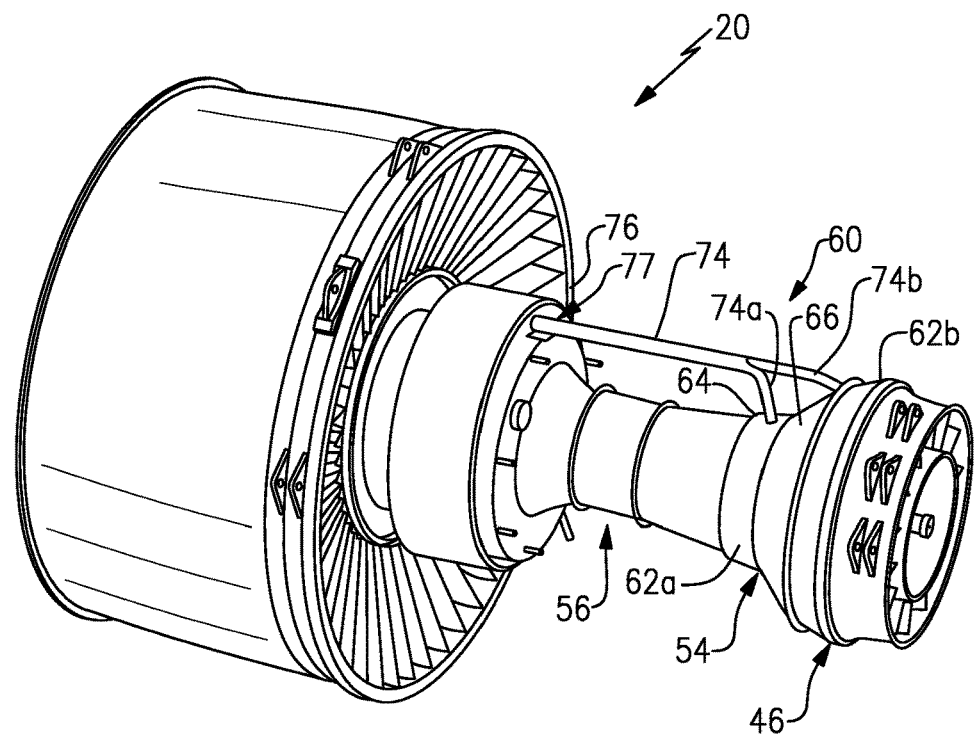
FIG. 2 illustrates a perspective view of an active clearance control assembly for the gas turbine engine.

As shown in FIGS. 1 and 2, the gas turbine engine 20 includes an active clearance control 60 having a first manifold 62a surrounding the high pressure turbine 54 and a second manifold 62b surrounding the low pressure turbine 46. During operation of the gas turbine engine 20, a turbine case 64 surrounding the high pressure turbine 54 and the low pressure turbine 46 expands due to the heat generated from the combustor section 26. The expansion of the turbine case 64 introduces larger gaps between the ends of the turbine blades and the turbine case 64, which reduces the efficiency of the gas turbine engine 20.

The active clearance control 60 shrinks the turbine case 64 by directing cooling fluid, such as air, along an outside of the turbine case 64. The shrinkage of the turbine case 64 reduces air leakage between the turbine blades and the turbine case 64 and increase the efficiency of the gas turbine engine 20. The shrinkage introduced by the active clearance control 60 is beneficial when operating under cruise conditions with the turbine case 64 subject to heat from combustor section 26.

Figure 3:
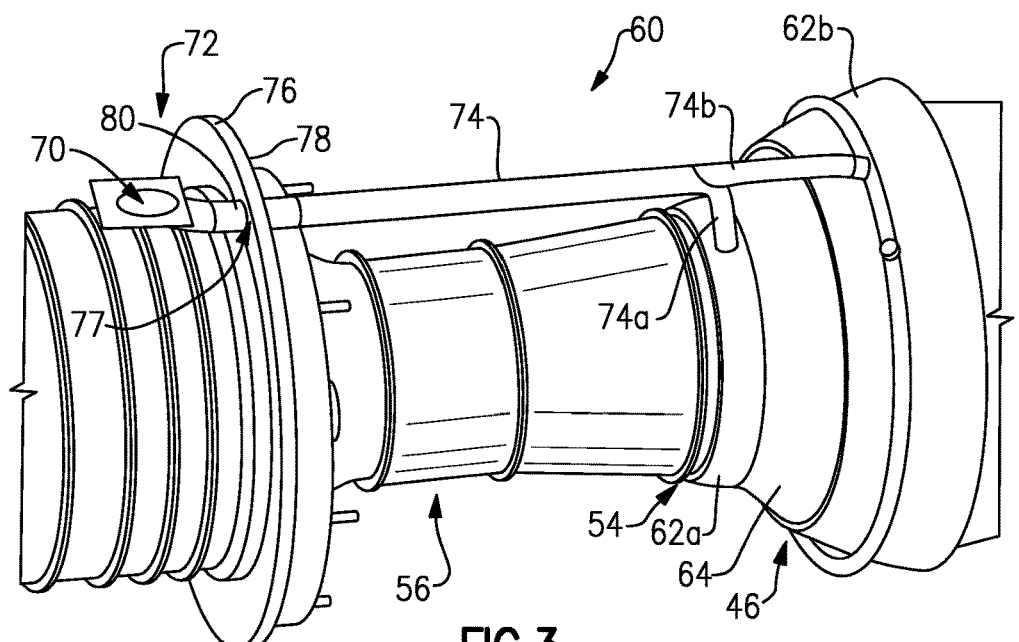
FIG. 3 illustrates another perspective view of the active clearance control assembly of FIG. 2.

In the illustrated example shown in FIG. 3, an intake 70 in an inner nacelle 72. The intake 70 is located on a radially inner side of the bypass airflow path B of the fan section 22 generally outward from the compressor section 24. In one example, the intake 70 is generally elliptical and flush with the inner nacelle 72. In another example, the intake 70 protrudes from the inner nacelle 72 and creates a ram air induction.

A conduit 74 extends from the intake 70 and includes a first branch 74a for directing cooling fluid to the first manifold 62a and a second branch 74b for directing cooling fluid to the second manifold 62b. The conduit 74 extends through a firewall opening 77 in a firewall 76. The firewall 76 includes a receptacle 78, such as a groove, along an outer diameter for sealing D-Doors (not shown) that enclose the combustor section 26 and the turbine section 28.

A valve 80 is located upstream of the firewall 76 and on an opposite side of the firewall 76 from the combustor section 26. The valve 80 is located radially inward from the inner nacelle 72 and radially outward from the compressor section 24. The firewall 76 aids in shielding the valve 80 from the elevated temperatures associated with the combustor section 26 to increase the lifespan of the valve 80.

Figure 4:
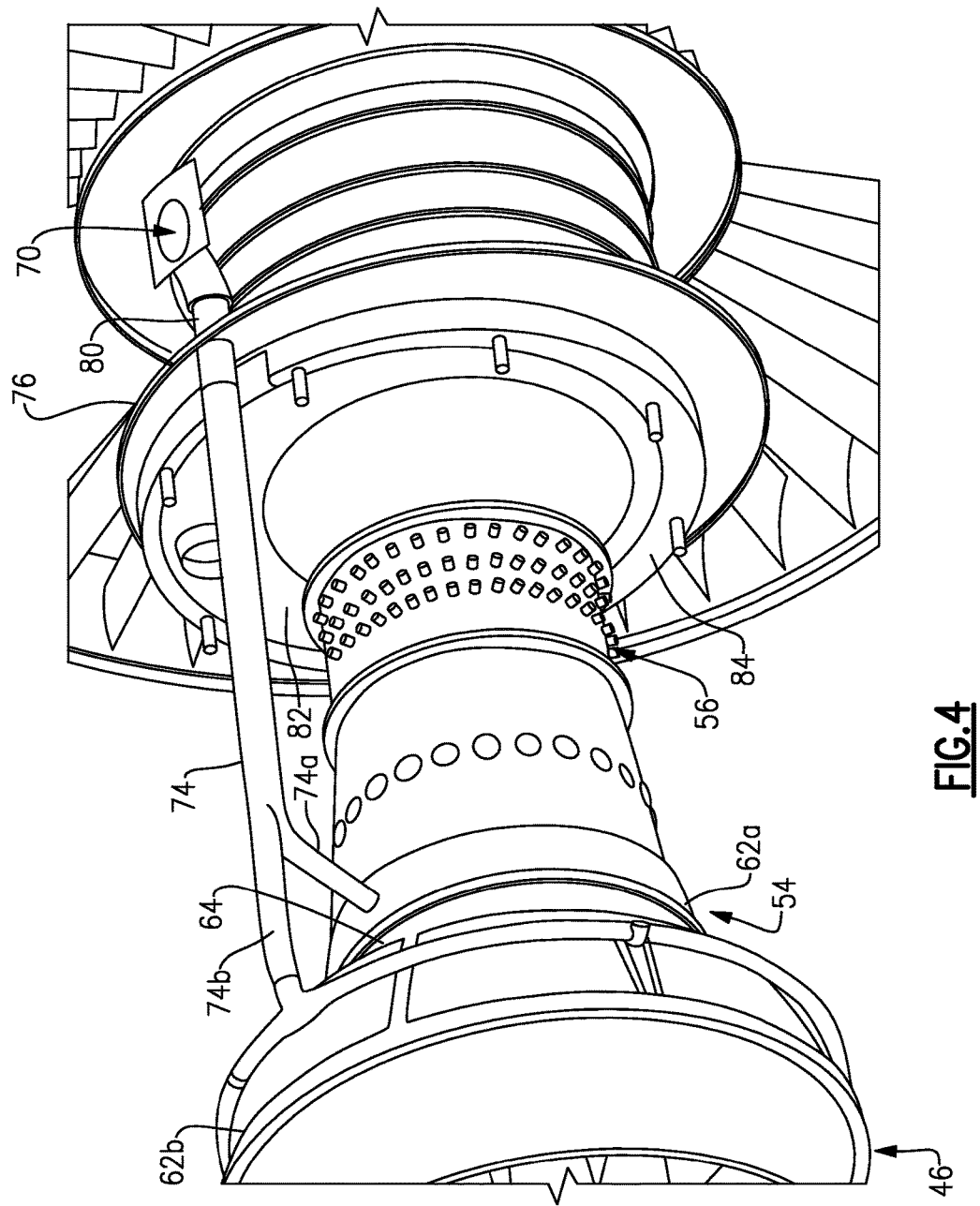
FIG. 4 illustrates yet another perspective view of the active clearance control assembly of FIG. 2.

As shown in FIG. 4, the firewall 76 includes on a downstream side an ECS manifold 82 for providing cooling air to the ECS module and a nacelle ventilation manifold 84 for providing cooling air to the nacelle.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A gas turbine engine comprising:
a fluid intake;
a turbine section including a turbine case;
a firewall located upstream of the turbine section;
a conduit configured to direct a fluid from the fluid intake to the turbine case; and
a valve located on a first side of the firewall opposite from the turbine section and configured to regulate a flow of the fluid through the conduit.

2. The gas turbine engine of claim 1 including a combustor section, wherein the combustor section is located on a second side of the firewall opposite the first side of the firewall.

3. The gas turbine engine of claim 1 including at least one fluid delivery manifold in fluid communication with the conduit for directing the fluid along the turbine case.

4. The gas turbine engine of claim 3 wherein the fluid delivery manifold surrounds the turbine case.

5. The gas turbine engine of claim 1 wherein the conduit is configured to direct the fluid from the first side of the firewall to a second side of the firewall opposite the first side of the firewall.

6. The gas turbine engine of claim 1 wherein the fluid intake protrudes through an inner nacelle and is in fluid communication with a bypass airflow path in a fan section.

7. The gas turbine engine of claim 1 wherein the fluid intake is elliptical.

8. The gas turbine engine of claim 1 wherein the fluid intake extends into a fan bypass flow path and is in fluid communication with the fluid intake.

9. The gas turbine engine of claim 1 wherein the firewall includes an ECS manifold and a nacelle ventilation manifold.

10. The gas turbine engine of claim 1 wherein the fluid intake is located on the first side of the firewall.

11. The gas turbine engine of claim 1, wherein the turbine section includes a high pressure turbine and a low pressure turbine and the conduit is in fluid communication with a first manifold surrounding the high pressure turbine and a second manifold surrounding the low pressure turbine.

12. The gas turbine engine of claim 11, wherein the first manifold is configured to direct the fluid at an outside surface of the high pressure turbine.

13. The gas turbine engine of claim 12, wherein the second manifold is configured to direct the fluid at an outside surface of the low pressure turbine.

14. The gas turbine engine of claim 11, wherein the conduit includes a first branch in fluid communication with the first manifold and a second branch in fluid communication with the second manifold.

15. The gas turbine engine of claim 14, wherein the first branch is located axially upstream of the low pressure turbine.

16. The gas turbine engine of claim 1, wherein the firewall includes side an ECS manifold located on a downstream side of the firewall and the ECS manifold is in fluid communication with an ESC module.

17. The gas turbine engine of claim 16, wherein the firewall includes a nacelle ventilation manifold on a downstream side of the firewall and the nacelle ventilation manifold is in fluid communication with the nacelle.

18. The gas turbine engine of claim 1, wherein the intake is directed radially outward relative to an axis of rotation of the gas turbine engine.

19. The gas turbine engine of claim 1, wherein the conduit extends radially inward from the fluid intake relative to an axis of rotation of a gas turbine engine.

20. The gas turbine engine of claim 19, wherein the conduit and the fluid intake are located radially outward and spaced from a compressor section of the gas turbine engine.

* * * * *